(12) United States Patent
Singh et al.

(10) Patent No.: US 11,032,192 B2
(45) Date of Patent: Jun. 8, 2021

(54) SIGNALING A PLANNED OFF-LINING, SUCH AS FOR MAINTENANCE, OF A NODE OR NODE COMPONENT SUPPORTING A LABEL SWITCHED PATH (LSP), AND USING SUCH SIGNALING

(71) Applicant: Juniper Networks, Inc., Sunnyvale, CA (US)

(72) Inventors: Nischal Singh, Santa Clara, CA (US); Raveendra Torvi, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 69 days.

(21) Appl. No.: 16/412,300

(22) Filed: May 14, 2019

(65) Prior Publication Data
US 2020/0366601 A1 Nov. 19, 2020

(51) Int. Cl.
*H04L 12/24* (2006.01)
*H04L 12/703* (2013.01)
(Continued)

(52) U.S. Cl.
CPC .......... *H04L 45/50* (2013.01); *H04L 41/0654* (2013.01); *H04L 41/0668* (2013.01);
(Continued)

(58) Field of Classification Search
CPC ..... H04L 45/50; H04L 69/40; H04L 67/1048; H04L 47/724; H04L 41/0668;
(Continued)

(56) References Cited

U.S. PATENT DOCUMENTS 9,577,925 B1 2/2017 Bahadur et al.
9,769,017 B1 * 9/2017 Jose ..................... H04L 41/0695
(Continued)

OTHER PUBLICATIONS

Extended European Search Report to corresponding European Patent Application No. 19181593.5-1213, dated Nov. 14, 2019 (11 pgs.).

*Primary Examiner* — Moo Jeong
(74) *Attorney, Agent, or Firm* — John C. Pokotylo; Pokotylo Patent Services

(57) ABSTRACT

A node of an LSP may inform the ingress node of the LSP, for example via RSVP signaling, about its temporary unavailability for a certain time. In response, the ingress node can stop using any affected LSP(s) and divert the traffic to other LSPs. This provides a faster mechanism to signal traffic shift then traditional IGP overload which causes considerable churn into the network as all the nodes need to compute the SPF. It is sufficient for ingress node to be aware of this node maintenance and it can use information to divert the traffic to other equal cost multipath (ECMP) LSP(s), or other available LSP(s). If no alternative LSP path exists when the ingress node receives such a message, a new LSP can be built during this time and traffic diverted smoothly (e.g., in a make-before-break manner) before the node goes offline for maintenance. Since only the ingress node is responsible to push the traffic to the LSP, there is no need to tear down the LSP for such node maintenance (especially when they are for a short duration). This can be used with a controller responsible for the LSP as well.

20 Claims, 14 Drawing Sheets

(51) Int. Cl.
*H04L 12/707* (2013.01)
*H04L 12/717* (2013.01)
*H04L 12/723* (2013.01)
*H04L 12/913* (2013.01)
*H04L 29/08* (2006.01)
*H04L 29/14* (2006.01)

(52) U.S. Cl.
CPC .............. *H04L 45/22* (2013.01); *H04L 45/24* (2013.01); *H04L 45/28* (2013.01); *H04L 45/42* (2013.01); *H04L 67/1048* (2013.01); *H04L 69/40* (2013.01); *H04L 47/724* (2013.01)

(58) Field of Classification Search
CPC ..... H04L 41/0654; H04L 45/28; H04L 45/42; H04L 45/24; H04L 45/22
See application file for complete search history.

(56) References Cited

U.S. PATENT DOCUMENTS

| | | |
|---|---|---|
| 9,781,030 B1 | 10/2017 | Torvi |
| 10,542,077 B1 * | 1/2020 | Balakrishnan .......... H04L 45/16 |
| 2013/0044586 A1 | 2/2013 | Hanif et al. |

* cited by examiner

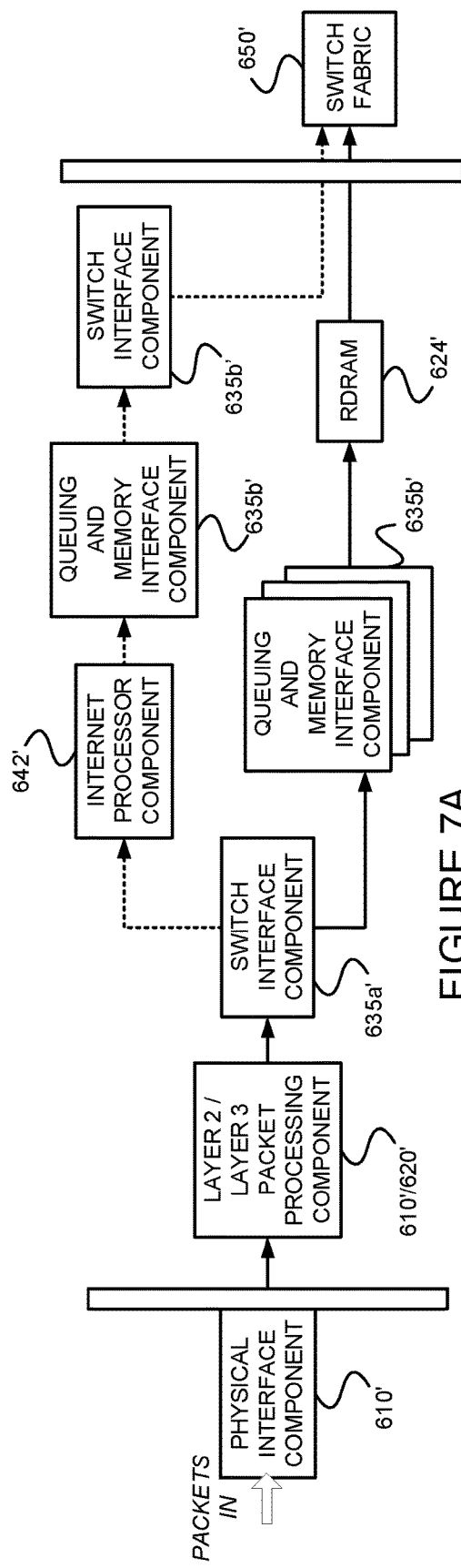
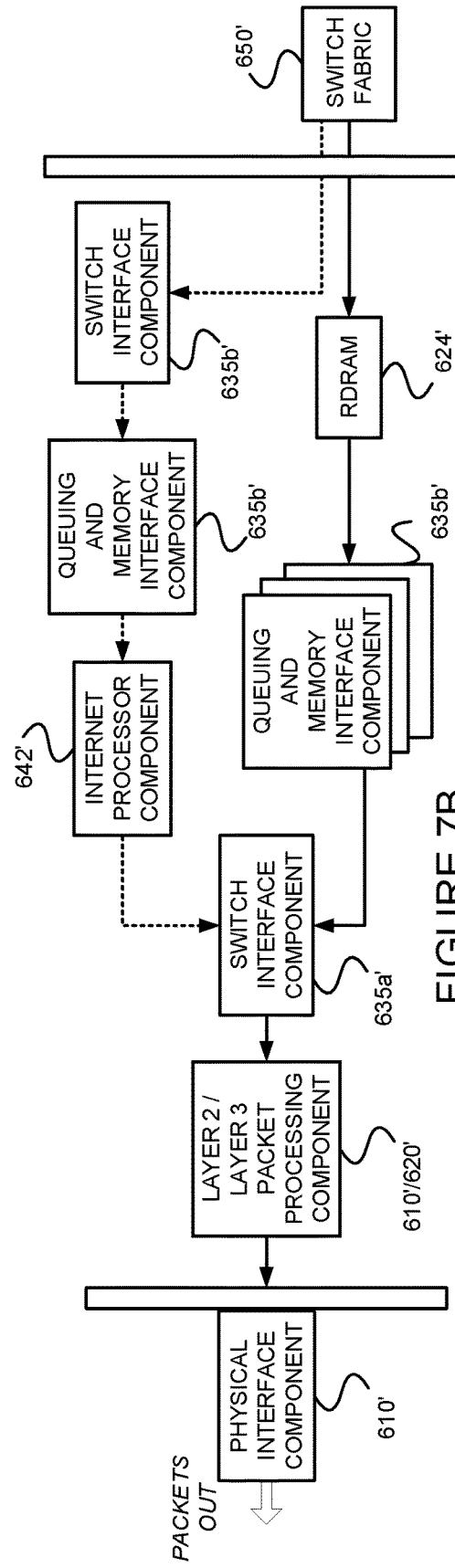
FIGURE 7A
FIGURE 7B

SIGNALING A PLANNED OFF-LINING, SUCH AS FOR MAINTENANCE, OF A NODE OR NODE COMPONENT SUPPORTING A LABEL SWITCHED PATH (LSP), AND USING SUCH SIGNALING

1. BACKGROUND OF THE INVENTION

1.1 Field of the Invention

The present description concerns communications networks. More specifically, the present invention concerns problems in label switched paths (LSPs) when a transit router in the LSP is taken offline (e.g., for maintenance).

1.2 Background Information

1.2.1 Label-Switched Paths (LSPs)

In the traditional packet-forwarding paradigm, as a packet travels from one switch to the next, an independent forwarding decision is made at each hop. The Internet protocol ("IP") network header is analyzed (e.g., each switch performs an IP routing lookup), the next hop is chosen based on this analysis and on information in a routing table, and a packet is then forwarded to that next-hop. In a Multiprotocol Label Switching ("MPLS") environment, the analysis of the packet header is made only once, when a packet enters the MPLS tunnel (that is, the path used for MPLS traffic). More specifically, MPLS uses labels to route packets instead of using IP addresses. In a traditional network, with MPLS, only the first device does a routing lookup, and, instead of finding the next-hop, finds the ultimate destination along with a path to that destination. The path of an MPLS packet is called a label-switched path (LSP).

MPLS applies one or more labels to a packet so it can follow the LSP to the destination. Each switch (generally referred to as a "router," or a "label switching router," or "LSR") in the LSP pops off its label and sends the packet to the next switch label in the sequence. More specifically, when an IP packet enters an LSP, the ingress provider edge (PE) switch examines the packet, assigns it a label based on its destination, and places the label in the packet's header. The label transforms the packet from one that is forwarded based on its IP routing information to one that is forwarded based on information associated with the label. The packet is then forwarded to the next provider switch in the LSP. This switch and all subsequent switches in the LSP do not need to examine any of the IP routing information in the labeled packet. Rather, they use the label to look up information in their label forwarding table. They then replace the old label with a new label and forward the packet to the next switch in the path. When the packet reaches the egress PE switch, the label is removed (unless the label was "popped" instead of "swapped" at the penultimate switch of the LSP), and the packet again becomes a native IP packet and is forwarded based on its IP routing information.

Labels can be "pushed," "popped," or "swapped." The push operation affixes a new label to the top of the IP packet. For IPv4 packets, the new label is the first label. The pop operation removes a label from the beginning of the packet. Once the label is removed, the underlying IP packet is forwarded as a native IP packet. The swap operation removes an existing MPLS label from an IP packet and replaces it with a new MPLS label, using (1) the interface on which the packet was received (i.e., the incoming interface), (2) the existing label and (3) the switch's label forwarding table.

FIG. 1 illustrates an LSP between an ingress (or "head-end") router PE1 110 and an egress (or "tail end") router PE2 120. Router CE1 105 forwards an Internet Protocol (IP) packet 150 to its next hop (router PE1 110), which is the LSP ingress (or headend). Ingress router PE1 110 pushes label 1 (L1) 155 on the packet 150 and forwards the labeled packet 150+155 to "transit" router P1 112. Transit router P1 112 completes the standard MPLS label swapping operation, swapping label 1 155 for label 2 (L2) 160, and forwards the labeled packet 150+160 to "transit" router P2 114. Since transit router P2 114 is the penultimate-hop router for the LSP to router PE2 120, it 114 first pops the label L2 160 and then forwards the packet 150 to egress (or tail end) router PE2 120. When egress router PE2 120 receives the packet 150, it can have a service label, an explicit-null label, or just be a plain IP or VPLS packet. Egress router PE2 120 then forwards the unlabeled packet 150 to router CE2 125. If ultimate hop popping is used, the label will be swapped rather than popped (not shown) at transit router P2, and then popped (not shown) at egress router PE2 instead. Thus, with PHP, the penultimate provider switch is responsible for popping the MPLS label and forwarding the traffic to the egress PE switch. The egress PE switch then performs an IP route lookup and forwards the traffic. If ultimate-hop popping is used instead, the egress PE switch of the LSP pops the label.

LSPs can be established using (a) static configuration in which an administrator manually assigns labels on all routers involved (ingress, transit, and egress) in the LSP, or (b) some signaling protocol, such as the label distribution protocol ("LDP") (See, e.g., "Label Distribution Protocol," *Request for Comments:* 5036 (Internet Engineering Task Force, October 2007)(referred to as "RFC 5036" and incorporated herein by reference).), or the resource reservation protocol ("RSVP") (See, e.g., the "Resource ReSerVation Protocol (RSVP)," *Request for Comments:* 2205 (Internet Engineering Task Force, September 1997)(referred to as "RFC 2205" and incorporated herein by reference).).

LDP is a protocol for distributing labels in non-traffic-engineered applications. LDP allows routers to establish LSPs through a network by mapping network-layer routing information directly to data link LSPs. These LSPs might have an endpoint at a directly attached neighbor (comparable to IP hop-by-hop forwarding), or at a network egress node, enabling switching through all intermediary nodes. LSPs established by LDP can also traverse traffic-engineered LSPs created by RSVP.

LDP associates a forwarding equivalence class (FEC) with each LSP it creates. The FEC associated with an LSP specifies which packets are mapped to that LSP. LSPs are extended through a network as each router chooses the label advertised by the next hop for the FEC and splices it to the label it advertises to all other routers. This process forms a tree of LSPs that converge on the egress router.

RSVP is used to set up an LSP and dynamically assigns labels. RSVP signaling messages are used to set up signaled paths; only the ingress router is configured. The transit and egress routers accept signaling information from the ingress router, and set up and maintain the LSP cooperatively. Any errors encountered while establishing an LSP are reported to the ingress router for diagnostics.

RSVP-signaled LSPs include explicit-path LSPs and constrained-path LSPs. In explicit-path LSPs, all intermediate hops of the LSP are manually configured. The intermediate hops can be "strict," "loose," or any combination of the two. Explicit path LSPs provide the network administrator with complete control over how the path is set up. They are similar to static LSPs, but require much less configuration. With constrained-path LSPs, the intermediate hops of the LSP are automatically computed by the software. The computation considers information provided by the topology information from the (Intermediate System-Intermediate System ("IS-IS") or open shortest path first ("OSPF") link-state routing protocol, the current network resource utilization determined by RSVP, and the resource requirements and constraints of the LSP.

1.2.2 Problems when Taking Lsp Routers Offline, Such as for Maintenance

Many network operators perform day-to-day maintenance activities in their network devices. Often, such maintenance includes replacing a single hardware element, such as line card for example. Even though some transit routers carry only labeled traffic and hold RSVP LSPs, when a transit router is to go offline for maintenance, "IGP overload" is typically used to inform the head end (i.e., ingress) router of the RSVP tunnel about such maintenance. In IS-IS, IGP overload indicates that the node (or a link to the node) is not useable. In OSPF, IGP overload maximizes the cost of the node (or a link to the node). In an RSVP-only network, there is no mechanism to inform RSVP neighbors that an transit node is going to go offline for maintenance.

When a transit node goes offline for maintenance, this may be signaled using IGP overload. Using IGP overload causes all LSPs passing through the transit node (e.g., in the node being taken offline, or in a line card being removed, or in any other "node component" needed to support the LSP) to re-signal (and be reestablished) avoiding the transit node (of the line card, or of any node component needed to support the LSP) going for maintenance. Consequently, using "IGP overload" as a mechanism for signaling that a transit router (or a line card of the transit router, or some other node component) is going for maintenance disadvantageously creates unwanted churn in the network. For example, in a predominately MPLS network, if all the traffic from the core routers uses RSVP for LSP signaling, using IGP overload could be very network intensive as it essentially requires (1) the IGP to "cost out" the node going for maintenance (e.g., sending link state advertisements ("LSAs") with an infinite metric and running shortest path first ("SPF")) and then (2) re-signaling of all the LSPs which were previously transitioned via the transit node going for maintenance.

Many content providers that operate their own network(s) (e.g., Google Inc. of Mountainview, Calif., Facebook of Menlo Park, Calif., Amazon of Seattle, Wash., etc.) rely heavily on RSVP LSPs and only have MPLS traffic via transit routers. Due to frequent node maintenance, LSP churn in their networks caused by using IGP overload is a problem for them.

In view of the foregoing, it would be useful to signal that a transit router is to undergo maintenance while avoiding LSP churn that can occur in the network if IGP overload were to be used.

2. SUMMARY OF THE INVENTION

The problem of LSP churn caused by using IGP overload in a system having an established label switched path (LSP) and including a transit router and an ingress router (especially in MPLS networks that use RSVP for LSP signaling) may be solved by: (a) receiving an instruction that the transit router, or a component of the transit router supporting the LSP, will be taken down for maintenance at some time in the future, for some defined duration; (b) generating at least one maintenance notification message (1) specifying the LSP, (2) including information directly or indirectly specifying the time, and (3) including information specifying the defined duration; and (c) transmitting the at least one maintenance notification message to at least one of (A) an upstream neighbor node in the LSP, and (B) a central controller.

In at least some example methods consistent with the foregoing, the information directly or indirectly specifying the time is a first timer value, and the information specifying the defined duration is a second timer value.

At least some example methods consistent with the foregoing may further (d) receive the at least one notification message from a downstream neighbor node; and (e) responsive to receiving the at least one notification message, (1) start a first timer using the first timer value, and (2) relax signaling used to maintain the LSP. If the at least one notification message received from a downstream neighbor node is received by the ingress router, the example method may further (3) determine whether an alternative label switched path (LSP) to the egress router of the LSP is available, and (4) responsive to a determination that an alternative LSP to the egress router of the LSP is available, switch over traffic from the LSP to the alternative LSP, and otherwise, responsive to a determination that an alternative LSP to the egress router of the LSP is not available, (i) establish a new label switched path (LSP) to the egress router of the LSP, and (ii) switch over traffic from the LSP to the new LSP. In some such example methods, the act of switching over traffic from the LSP to the new or alternative LSP is performed in a make-before-break manner.

At least some example methods further (f) start a second timer using the second timer value responsive to an expiration of the first timer, and (g) switch traffic from one of the alternative LSP or the new LSP back to the LSP responsive to an expiration of the second timer. The act of switching traffic from one of the alternative LSP or the new LSP back to the LSP may be performed in a make-before-break manner.

At least some example methods further (f) responsive to an expiration of the first timer, (1) mark the LSP as unusable for traffic forwarding, and (2) start a second timer using the second timer value; and (g) switch traffic from one of the alternative LSP or the new LSP back to the LSP responsive to an expiration of the second timer.

In at least some example methods, the at least one maintenance notification message is a single message carried in a single packet.

In at least some example methods, the instruction that the transit router, or a portion of the transit router supporting the LSP, will be taken down for maintenance at some time in the future, for some defined duration, is received from a command line interface of the transit router.

In at least some example methods, the instruction that the transit router, or a portion of the transit router supporting the LSP, will be taken down for maintenance at some time in the future, for some defined duration, is received from a management interface of the transit router.

The foregoing example methods may be performed one or more of a transit node of an LSP, an ingress node of an LSP, and a central controller managing the LSP.

Example embodiments consistent with the present description enable a node of an LSP to inform the ingress node(s) via RSVP signaling (e.g., using an RSVP-overload message consistent with the present description) about its temporary unavailability for a certain time. In response, the ingress nodes can stop using any affected LSP(s) and divert the traffic to other LSPs. This provides a faster mechanism to signal traffic shift then traditional IGP overload which, as noted above, causes considerable churn into the network as all the nodes need to compute the SPF. It is sufficient for ingress node to be aware of this node maintenance and it can use information to divert the traffic to other equal cost multipath (ECMP) LSP(s), or other available LSP(s). If no alternative LSP path exists when the ingress node receives such a message, a new LSP can be built during this time and traffic diverted smoothly (e.g., in a make-before-break manner) before the node goes offline for maintenance. Since only the ingress node is responsible to push the traffic to the LSP, there is no need to tear down the LSP for such node maintenance (especially when they are for a short duration, such as a single line card (e.g., flexible physical interface card (PIC) concentrator (FPC), replacement which holds only a section of total transit LSPs). The described example techniques will work well with the controller-based applications that monitor and provision RSVP LSP(s); a simple message to ingress nodes and/or a controller is sufficient (without any need of expensive IGP overload). The controller can quickly build an alternative path and push it to the ingress node before the transit node (or a component of the transit node supporting the LSP) is taken offline (e.g., for maintenance).

3. BRIEF DESCRIPTION OF THE DRAWINGS

FIGS. 7A and 7B illustrate example packet forwarding operations of the example distributed ASICs of FIG. 6.

4. DETAILED DESCRIPTION

The present description may involve novel methods, apparatus, message formats, and/or data structures for informing an ingress node (and possibly other nodes) of an LSP that a transit node (or a node component supporting the LSP) of the LSP will be temporary unavailable during a certain time. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

4.1 Example Method(s)

Figure 2:
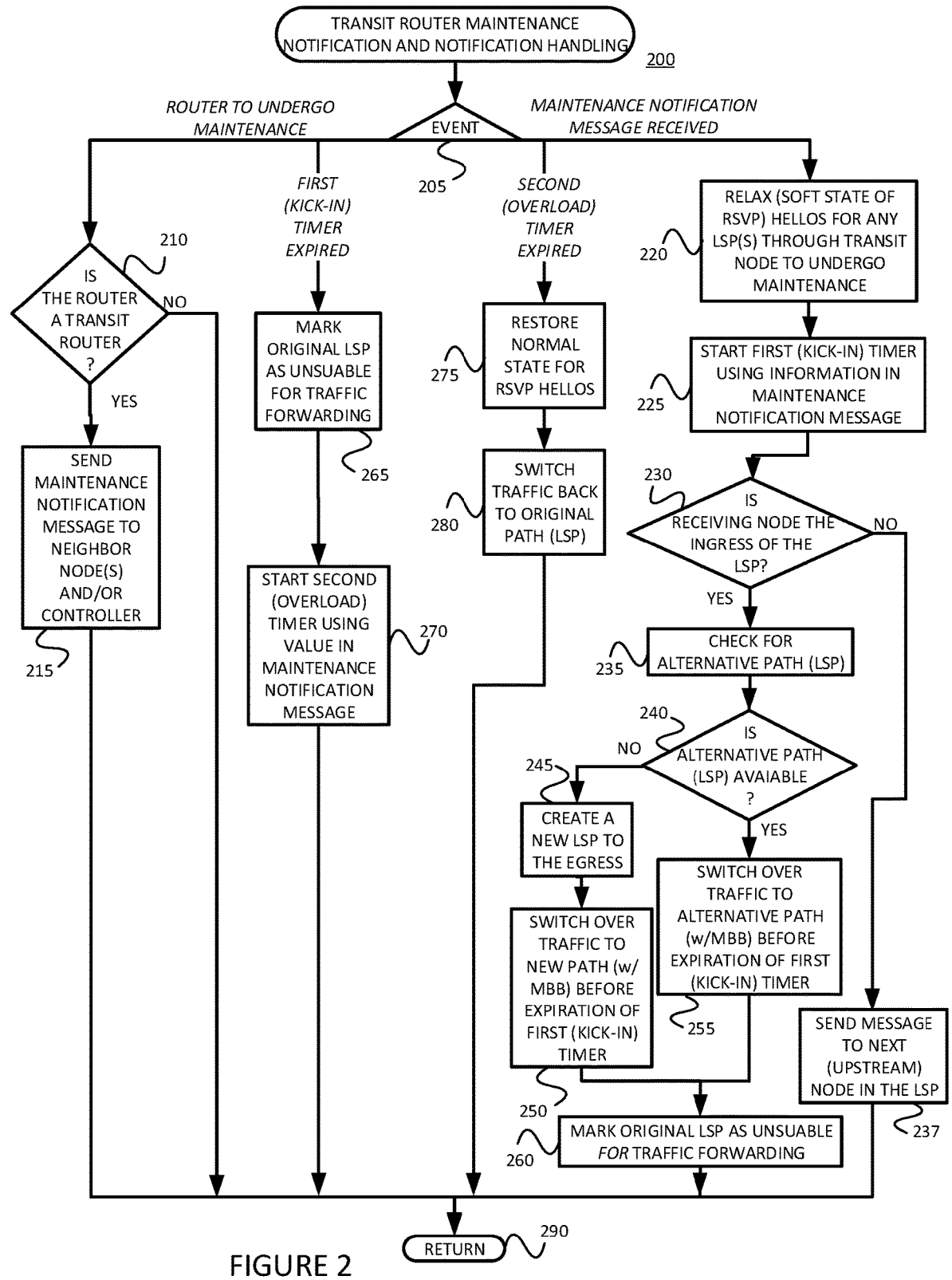
FIG. 2 is a flow diagram of an example method consistent with the present description.

FIG. 2 is a flow chart of an example method 200 consistent with the present description, for transit router maintenance notification generation and handling. As shown, various branches of the example method 200 are performed in response to the occurrence of various events. For example, referring to the left-most branch of the flow chart, responsive to determining that a router will undergo maintenance, the example method 200 determines whether or not the router is a transit router. (Decision 210) If so, a maintenance notification message is sent to (e.g., upstream) neighbor nodes (in the LSP) and/or to a controller. (Block 215).

Figure 3:
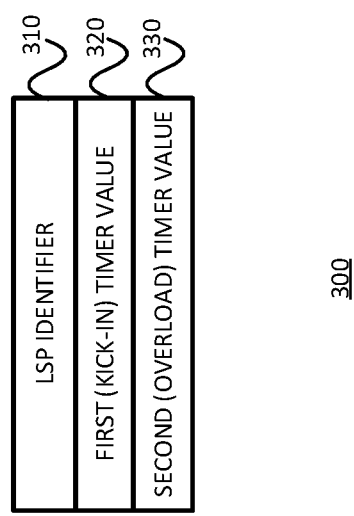
FIG. 3 is an example upcoming maintenance message consistent with the present description.

Referring to FIG. 3, in some example implementations consistent with the example method 200, an example message 300 may include, for each LSP passing through the transit node (or passing through a node component supporting the LSP) to undergo maintenance, an LSP identifier 310, a first timer (e.g., kick-in timer) value 320 and a second timer (e.g., overload timer) value 330. For example, for a transit (e.g., RSVP) node scheduled to undergo maintenance, an administrator or operator for the transit node under maintenance may configure the following configuration options:

set protocols rsvp overload overload-timer overload-kick-in-timer; and set protocols rsvp interface overload overload-timer overload-kick-in-timer where the "overload-timer" (second timer) is the duration for which the particular RSVP interface (or the entire node, or the node component needed to support the LSP) is scheduled or expected to go for maintenance, and the "overload-kick-in-timer" (first timer) is the duration for which the RSVP interface will still be available for the MPLS traffic forwarding purposes. The first configuration option is useful for when the entire transit node is to be taken offline, while the second configuration option is useful for when a specific interface of the transit node is to be taken offline. After the expiration of the first (e.g., overload-kick-in) timer, the RSVP link/node is scheduled to be taken down (e.g., taken offline, or otherwise to be unable to support an LSP) for maintenance. Thus, the ingress node of the LSP has the time specified in the overload-kick-in-timer (first timer) to switchover the LSP traffic from the transit node to another available LSP bypassing the transit node (or bypassing the component of the transit node to be taken offline), or to signal a new LSP bypassing the transit node (or bypassing the component of the transit node to be taken offline) and switchover to that.

Referring to the right-most branch of the flow chart, responsive to receiving a maintenance notification message, the receiving node may relax (e.g., enter a soft state for RSVP) Hellos for any LSP(s) through the transit node scheduled to undergo maintenance. (Block 220) A first (e.g., kick-in) timer is started using the information in the maintenance notification message (e.g., using the value in field 320 of the message 300). (Block 225) The example method 200 determines whether or not the receiving node is the ingress of the LSP. (Decision 230) If not (Decision 230, NO), the method 200 returns via node 290. If, however, it is determined that the receiving node is the ingress of the LSP (Decision 230, YES), the method 200 checks to determine whether or not there is an alternative path (LSP) available. (Block 235) If there is no alternative path available (Decision 240, NO), the method 200 creates a new LSP to the egress (Block 245) and switches over traffic to the new path (if possible, before expiration of the first (e.g., kick-in) timer). (Block 250) In some example embodiments consistent with example method 200, the switch over is performed in a make-before-break (MBB) manner. The original LSP may ben be marked as unusable for traffic forwarding. (Block 260) Referring back to decision 240, if, on the other hand, an alternative path is available (Decision 240, YES), the example method 200 switches over traffic to the alternative path (if possible, before expiration of the first (e.g., kick-in) timer). (Block 255) In some example embodiments consistent with example method 200, this switch over is performed in an MBB manner. Referring again to block 260, the original LSP may ben be marked as unusable for traffic forwarding.

Referring back to block 220, any upstream transit routers (and the ingress router) should maintain the LSP and should expect to miss otherwise expected RSVP Hello messages. (See, e.g., section 2.3 of RFC 2205.) That is, it is desired to not tear-down the original LSP even though it will be expected to be unable to forward traffic while the transit node (or a component of the transit node) is taken offline.

Referring to the second left-most branch of the flow chart, responsive to the expiration of the first (e.g., kick-in) timer, as an alternative to performing block 260 possibly before expiration of the first timer, the original LSP is marked as unusable for traffic forwarding. (Block 265) The second (e.g., overload) timer is then started using the value in the maintenance notification message. (Block 270. Recall, e.g., field 330 of example message 300.)

Finally, referring to the second right-most branch of the flow chart, responsive to the expiration of the second (e.g., overload) timer, the normal state for RSVP Hellos is restored (e.g., from the soft state set in Block 220) (Block 275), and the traffic is switched back to the original path (e.g., LSP) (Block 280). This switch may occur in an MBB manner.

Note that although many of the acts of the example method 200 were described as being performed by a node, such as an ingress node of the LSP(s), some or all of the acts of example method 200 may be performed by a controller that can communicate control information to and from the nodes (e.g., the ingress and transit nodes) of the LSP(s).

4.2 Example Message(s)

As already noted, referring to FIG. 3, in some example implementations, an example message 300 may include, for each LSP passing through the transit node (or passing through a node component supporting the LSP) to undergo maintenance, an LSP identifier 310, a first timer (e.g., kick-in timer) value 320 and a second timer (e.g., overload timer) value 330. For example, a new RSVP Path error code type may include:

- "overload" indicating to the ingress node(s) that a transit node is under maintenance and that the ingress node(s) needs to divert the traffic to one or more other available LSP(s);
- "overload-timer" (value in seconds) indicating to the ingress node(s) and/or controller that maintenance is scheduled for that many seconds; and
- "overload-kick-in timer" (value in seconds) indicating that the node will go for maintenance after these many seconds and if any computation of new LSP required, it can be may be done (and should be completed) during this this time.

Although the units of seconds was described, the timer values may be expressed in terms of other units of time instead. Note that each LSP that will be affected by the transit router being taken offline may have its own maintenance notification message.

Although not show, the message should also include an address or identifier of the transit node to be taken offline so that the alternative or new LSP will not include the particular transit node.

The example method 200 of FIG. 2 can use this RSVP-overload path error message and these timers to divert traffic to other available LSPs.

4.3 Example Apparatus

Figure 1:
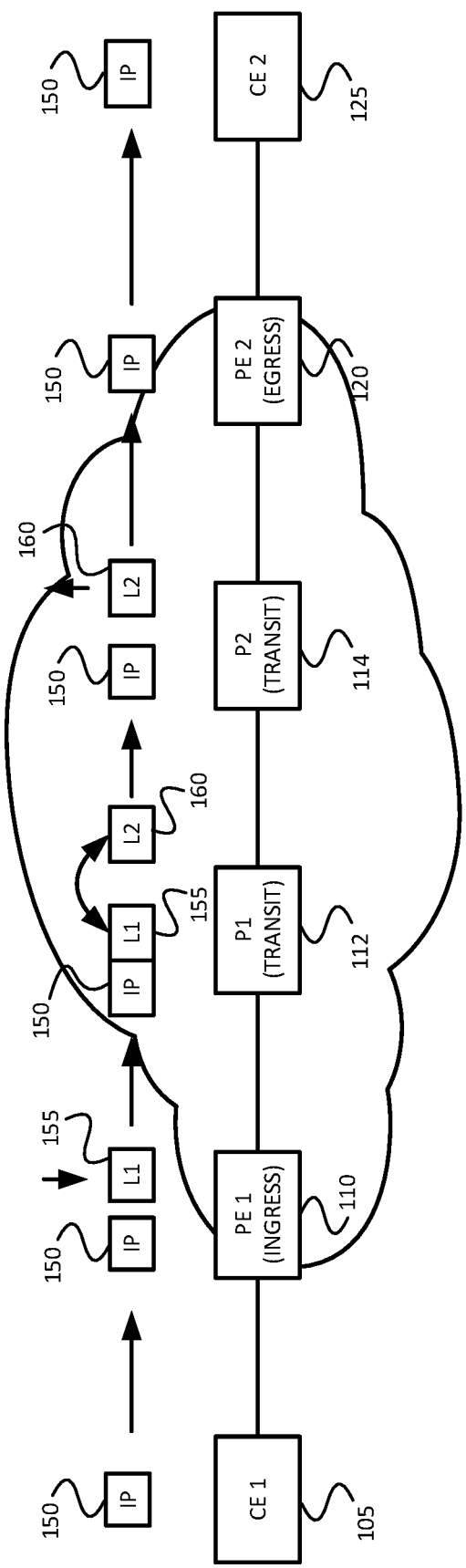
FIG. 1 illustrates in an LSP between two routers, in which PHP is used.
Figure 4:
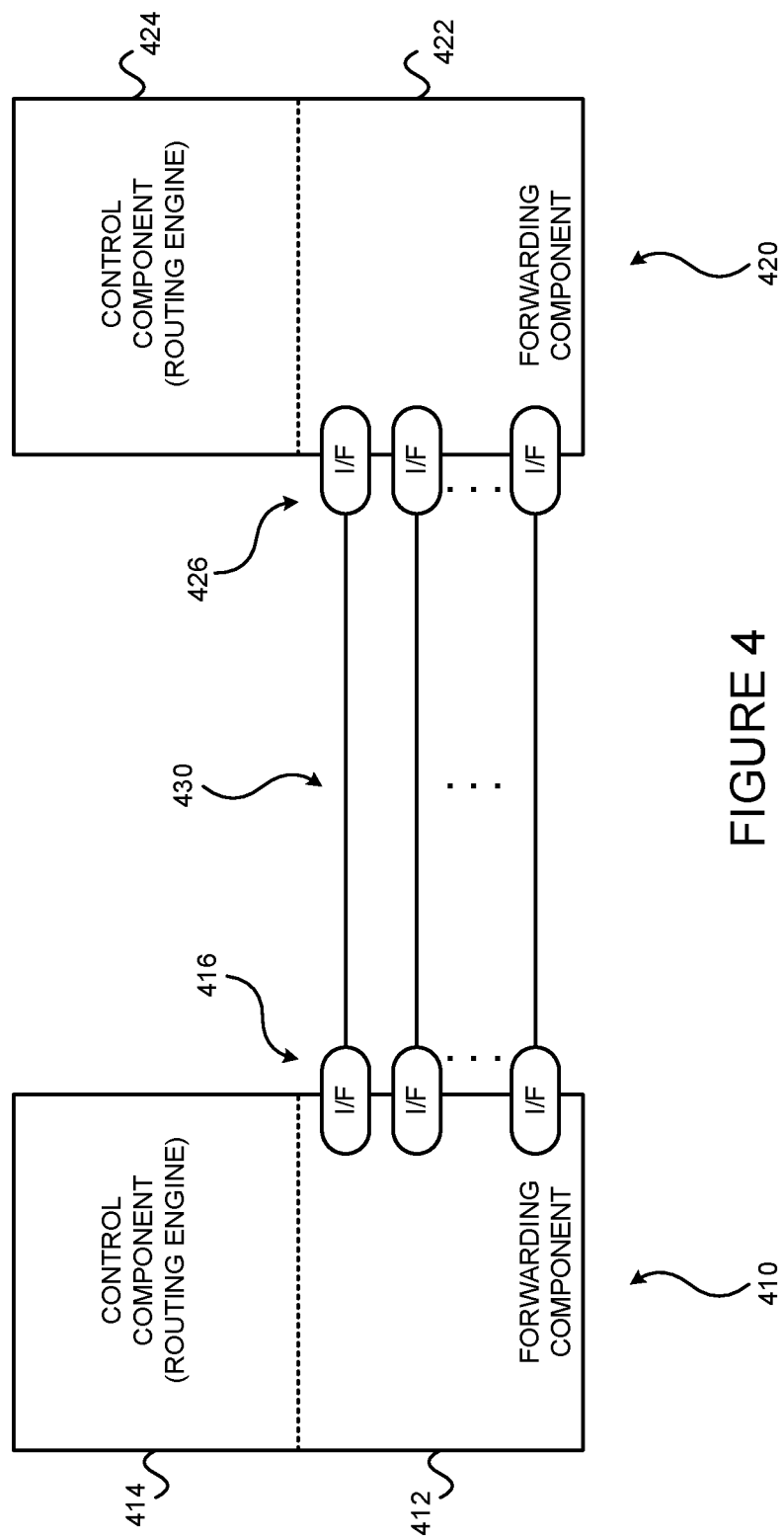
FIG. 4 illustrates an example environment including two systems coupled via communications links.

FIG. 4 illustrates two data forwarding systems 410 and 420 coupled via communications links 430. The links may be physical links or "wireless" links. The data forwarding systems 410,420 may be nodes, such as routers for example. If the data forwarding systems 410,420 are example routers, each may include a control component (e.g., a routing engine) 414,424 and a forwarding component 412,422. Each data forwarding system 410,420 includes one or more interfaces 416,426 that terminate one or more communications links 430. Any two of the label switched routers (LSRs) (Recall, e.g., FIG. 1) may be implemented on device 410 and/or 420. The example method 200 described above may be implemented in the control component 414 and/or 424 of device 410 and/or 420.

As just discussed above, and referring to FIG. 5, some example routers 500 include a control component (e.g., routing engine) 510 and a packet forwarding component (e.g., a packet forwarding engine) 590.

The control component 510 may include an operating system (OS) kernel 520, routing protocol process(es) 530, label-based forwarding protocol process(es) 540, interface process(es) 550, user interface (e.g., command line interface) process(es) 560, and chassis process(es) 570, and may store routing table(s) 539, label forwarding information 545, and forwarding (e.g., route-based and/or label-based) table(s) 580. As shown, the routing protocol process(es) 530 may support routing protocols such as the routing information protocol ("RIP") 531, the intermediate system-to-intermediate system protocol ("IS-IS") 532, the open shortest path first protocol ("OSPF") 533, the enhanced interior gateway routing protocol ("EIGRP") 534 and the border gateway protocol ("BGP") 535, and the label-based forwarding protocol process(es) 540 may support protocols such as BGP 535, the label distribution protocol ("LDP")

536 and the resource reservation protocol ("RSVP") 537. RSVP 537 may implement the example method 200 of FIG. 2, in part or in its entirety. One or more components (not shown) may permit a user 565 to interact with the user interface process(es) 560. Similarly, one or more components (not shown) may permit an outside device to interact with one or more of the router protocol process(es) 530, the label-based forwarding protocol process(es) 540, the interface process(es) 550, and the chassis process(es) 570, via SNMP 585, and such processes may send information to an outside device via SNMP 585. One or more of these processes may implement the example method 200 of FIG. 2, in part (Recall especially Block 215 of FIG. 2.) or in its entirety.

The packet forwarding component 590 may include a microkernel 592, interface process(es) 593, distributed ASICs 594, chassis process(es) 595 and forwarding (e.g., route-based and/or label-based) table(s) 596.

Figure 5:
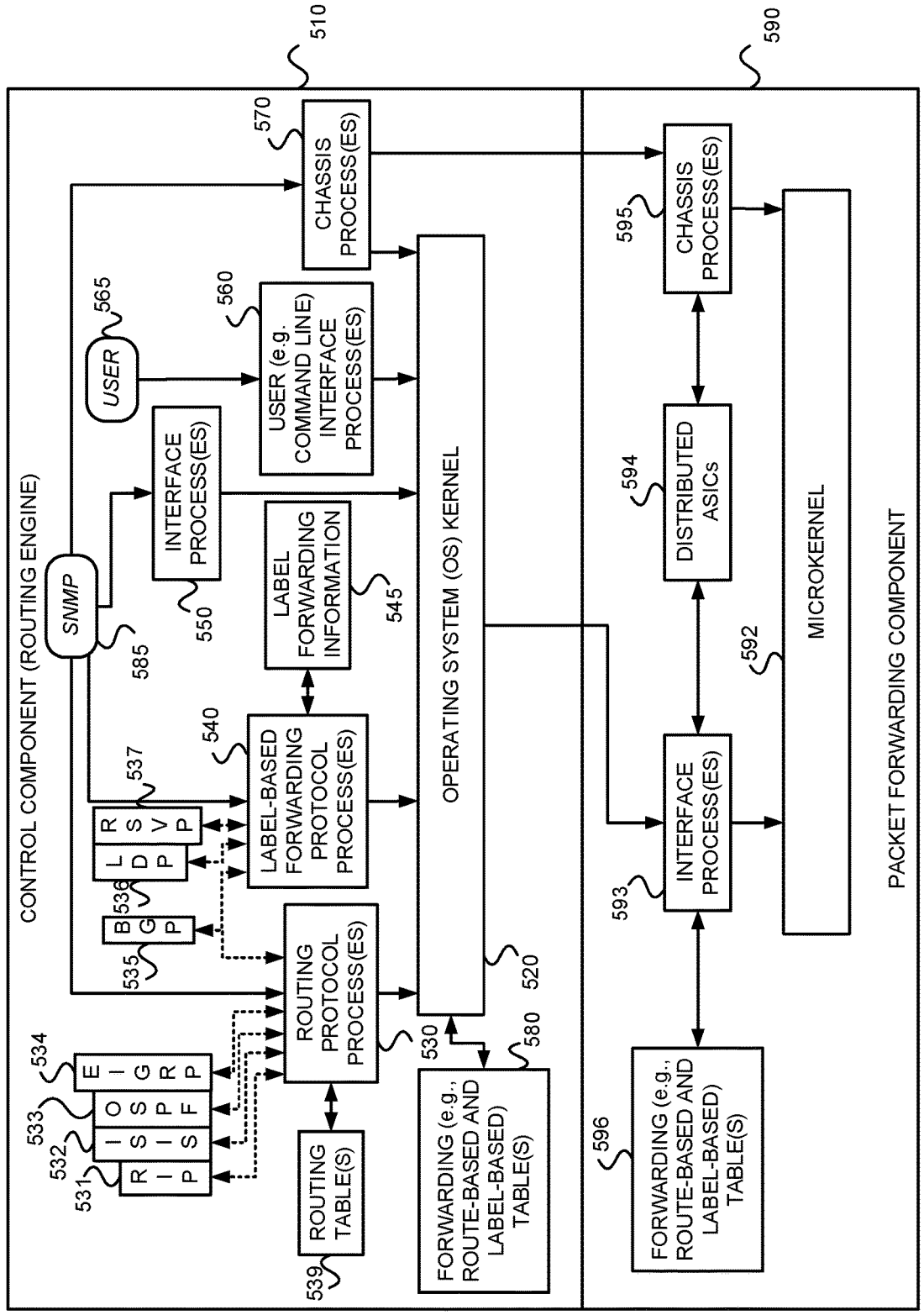
FIG. 5 is a block diagram of an example router on which the example methods of the present description may be implemented.

In the example router 500 of FIG. 5, the control component 510 handles tasks such as performing routing protocols, performing label-based forwarding protocols, control packet processing, etc., which frees the packet forwarding component 590 to forward received packets quickly. That is, received control packets (e.g., routing protocol packets and/or label-based forwarding protocol packets) are not fully processed on the packet forwarding component 590 itself, but are passed to the control component 510, thereby reducing the amount of work that the packet forwarding component 590 has to do and freeing it to process packets to be forwarded efficiently. Thus, the control component 510 is primarily responsible for running routing protocols and/or label-based forwarding protocols, maintaining the routing tables and/or label forwarding information, sending forwarding table updates to the packet forwarding component 590, and performing system management. The example control component 510 may handle routing protocol packets, provide a management interface, provide configuration management, perform accounting, and provide alarms. The processes 530, 540, 550, 560 and 570 may be modular, and may interact with the OS kernel 520. That is, nearly all of the processes communicate directly with the OS kernel 520. Using modular software that cleanly separates processes from each other isolates problems of a given process so that such problems do not impact other processes that may be running. Additionally, using modular software facilitates easier scaling.

Still referring to FIG. 5, the example OS kernel 520 may incorporate an application programming interface ("API") system for external program calls and scripting capabilities. The control component 510 may be based on an Intel PCI platform running the OS from flash memory, with an alternate copy stored on the router's hard disk. The OS kernel 520 is layered on the Intel PCI platform and establishes communication between the Intel PCI platform and processes of the control component 510. The OS kernel 520 also ensures that the forwarding tables 596 in use by the packet forwarding component 590 are in sync with those 580 in the control component 510. Thus, in addition to providing the underlying infrastructure to control component 510 software processes, the OS kernel 520 also provides a link between the control component 510 and the packet forwarding component 590.

Referring to the routing protocol process(es) 530 of FIG. 5, this process(es) 530 provides routing and routing control functions within the platform. In this example, the RIP 531, ISIS 532, OSPF 533 and EIGRP 534 (and BGP 535) protocols are provided. Naturally, other routing protocols may be provided in addition, or alternatively. Similarly, the label-based forwarding protocol process(es) 540 provides label forwarding and label control functions. In this example, the LDP 536 and RSVP 537 (and BGP 535) protocols are provided. Naturally, other label-based forwarding protocols (e.g., MPLS) may be provided in addition, or alternatively. One or more of these processes may implement the example method 200 of FIG. 2, in part or in its entirety. In the example router 500, the routing table(s) 539 is produced by the routing protocol process(es) 530, while the label forwarding information 545 is produced by the label-based forwarding protocol process(es) 540.

Still referring to FIG. 5, the interface process(es) 550 performs configuration of the physical interfaces (Recall, e.g., 516 and 526 of FIG. 5.) and encapsulation.

The example control component 510 may provide several ways to manage the router (e.g., for configuring the interval as discussed with reference to block 305 of FIG. 3). For example, it 510 may provide a user interface process(es) 560 which allows a system operator 565 to interact with the system through configuration, modifications, and monitoring. The SNMP 585 allows SNMP-capable systems to communicate with the router platform. This also allows the platform to provide necessary SNMP information to external agents. For example, the SNMP 585 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 510, thereby avoiding slowing traffic forwarding by the packet forwarding component 590.

Although not shown, the example router 500 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 560 via a console port, an auxiliary port, and/or a management Ethernet port. As noted, the interval may be configured using the CLI. The CLI 560 may implement the example method 200 of FIG. 2, in part (Recall especially Block 215 of FIG. 2.) or in its entirety.

The packet forwarding component 590 is responsible for properly outputting received packets as quickly as possible. If there is no entry in the forwarding table for a given destination or a given label and the packet forwarding component 590 cannot perform forwarding by itself, it 590 may send the packets bound for that unknown destination off to the control component 510 for processing. The example packet forwarding component 590 is designed to perform Layer 2 and Layer 3 switching, route lookups, and rapid packet forwarding.

As shown in FIG. 5, the example packet forwarding component 590 has an embedded microkernel 592, interface process(es) 593, distributed ASICs 594, and chassis process(es) 595, and stores a forwarding (e.g., route-based and/or label-based) table(s) 596. The microkernel 592 interacts with the interface process(es) 593 and the chassis process(es) 595 to monitor and control these functions. The interface process(es) 592 has direct communication with the OS kernel 520 of the control component 510. This communication includes forwarding exception packets and control packets to the control component 510, receiving packets to be forwarded, receiving forwarding table updates, providing information about the health of the packet forwarding component 590 to the control component 510, and permitting configuration of the interfaces from the user interface (e.g., CLI) process(es) 560 of the control component 510. The stored forwarding table(s) 596 is static until a new one is received from the control component 510. The interface process(es) 593 uses the forwarding table(s) 596 to look up next-hop information. The interface process(es) 593 also has direct communication with the distributed ASICs 594. Finally, the chassis process(es) 595 may communicate directly with the microkernel 592 and with the distributed ASICs 594.

Figure 6:
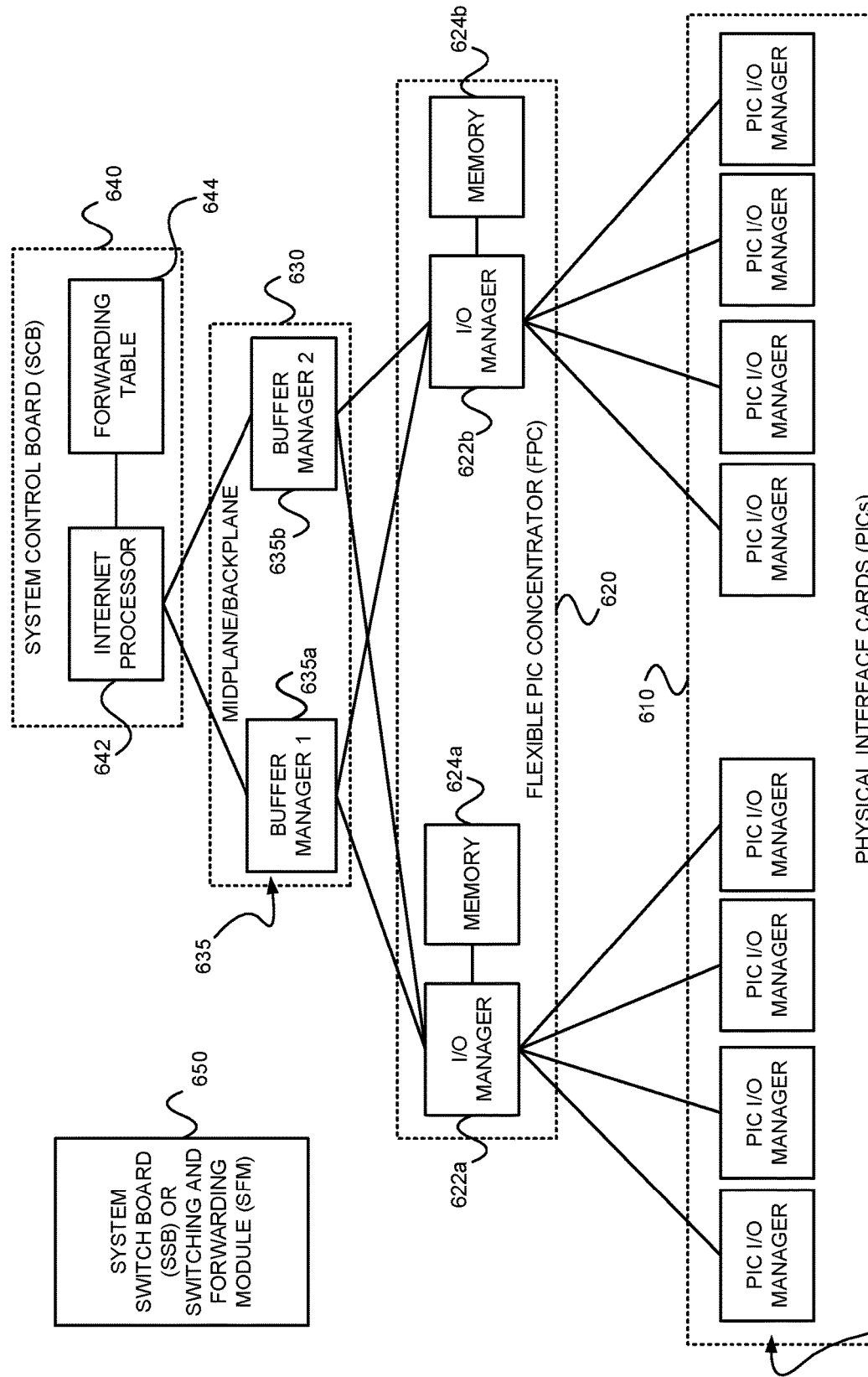
FIG. 6 is a block diagram of example distributed application specific integrated circuits ("ASICs") that may be provided in the example router of FIG. 5.

Referring back to distributed ASICs 594 of FIG. 5, FIG. 6 is an example of how the ASICS may be distributed in the packet forwarding component 590 to divide the responsibility of packet forwarding. As shown in FIG. 6, the ASICs of the packet forwarding component 590 may be distributed on physical interface cards ("PICs") 610, flexible PIC concentrators ("FPCs") 620, a midplane or backplane 630, and a system control board(s) 640 (for switching and/or forwarding). Switching fabric is also shown as a system switch board ("SSB"), or a switching and forwarding module ("SFM") 650. Each of the PICs 610 includes one or more PIC I/O managers 615. Each of the FPCs 620 includes one or more I/O managers 622, each with an associated memory 624. The midplane/backplane 630 includes buffer managers 635a, 635b. Finally, the system control board 640 includes an Internet processor 642 and an instance of the forwarding table 644 (Recall, e.g., 596 of FIG. 5).

Still referring to FIG. 6, the PICs 610 contain the interface ports. Each PIC 610 may be plugged into an FPC 620. Each individual PIC 610 may contain an ASIC that handles media-specific functions, such as framing or encapsulation. Some example PICs 610 provide SDH/SONET, ATM, Gigabit Ethernet, Fast Ethernet, and/or DS3/E3 interface ports.

An FPC 620 can contain from one or more PICs 610, and may carry the signals from the PICs 610 to the midplane/backplane 630 as shown in FIG. 6.

The midplane/backplane 630 holds the line cards. The line cards may connect into the midplane/backplane 630 when inserted into the example router's chassis from the front. The control component (e.g., routing engine) 510 may plug into the rear of the midplane/backplane 630 from the rear of the chassis. The midplane/backplane 630 may carry electrical (or optical) signals and power to each line card and to the control component 510. Recall that line cards of a router support one or more LSPs and may be taken down for maintenance.

The system control board 640 may perform forwarding lookup. It 640 may also communicate errors to the routing engine. Further, it 640 may also monitor the condition of the router based on information it receives from sensors. If an abnormal condition is detected, the system control board 640 may immediately notify the control component 510.

Referring to FIGS. 6, 7A and 7B, in some exemplary routers, each of the PICs 610,510' contains at least one I/O manager ASIC 615 responsible for media-specific tasks, such as encapsulation. The packets pass through these I/O ASICs on their way into and out of the router. The I/O manager ASIC 615 on the PIC 610,510' is responsible for managing the connection to the I/O manager ASIC 622 on the FPC 620,520', managing link-layer framing and creating the bit stream, performing cyclical redundancy checks (CRCs), and detecting link-layer errors and generating alarms, when appropriate. The FPC 620 includes another I/O manager ASIC 622. This ASIC 622 takes the packets from the PICs 610 and breaks them into (e.g., 64-byte) memory blocks. This FPC I/O manager ASIC 622 sends the blocks to a first distributed buffer manager (DBM) 635a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 635a' manages and writes packets to the shared memory 624 across all FPCs 620. In parallel, the first DBM ASIC 635a' also extracts information on the destination of the packet and passes this forwarding-related information to the Internet processor 642/542'. The Internet processor 642/542' performs the route lookup using the forwarding table 644 and sends the information over to a second DBM ASIC 635b'. The Internet processor ASIC 642/542' also collects exception packets (i.e., those without a forwarding table entry) and sends them to the control component 510. The second DBM ASIC 635b' then takes this information and the 64-byte blocks and forwards them to the I/O manager ASIC 622 of the egress FPC 620/520' (or multiple egress FPCs, in the case of multicast) for reassembly. (Thus, the DBM ASICs 635a' and 635b' are responsible for managing the packet memory 624 distributed across all FPCs 620/520', extracting forwarding-related information from packets, and instructing the FPC where to forward packets.)

The I/O manager ASIC 622 on the egress FPC 620/520' may perform some value-added services. In addition to incrementing time to live ("TTL") values and re-encapsulating the packet for handling by the PIC 610, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 622 on the egress FPC 620/520' may be responsible for receiving the blocks from the second DBM ASIC 635b', incrementing TTL values, queuing a pointer to the packet, if necessary, before applying CoS rules, re-encapsulating the blocks, and sending the encapsulated packets to the PIC I/O manager ASIC 615.

Figure 8:
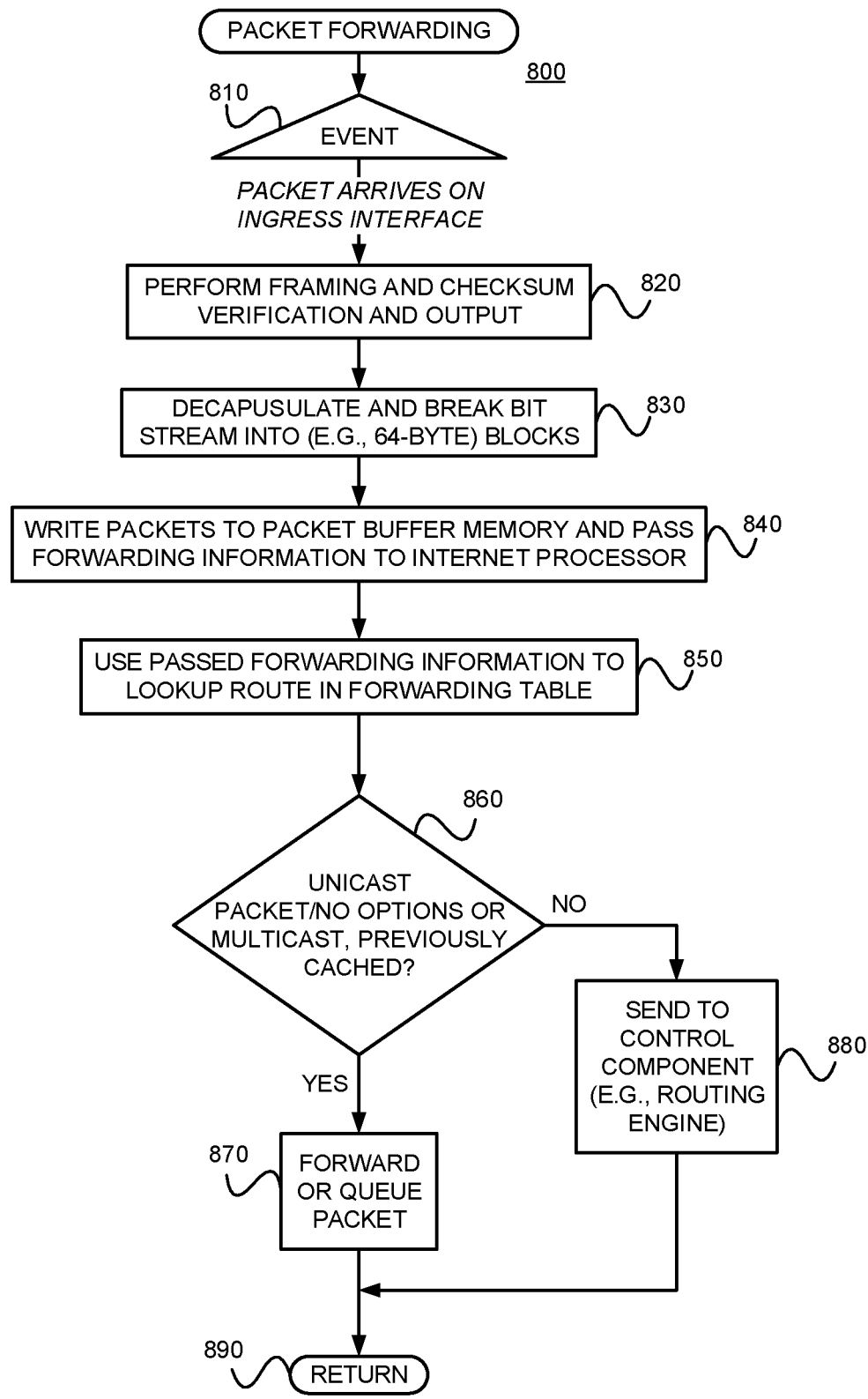
FIG. 8 is a flow diagram of an example packet forwarding method that may be implemented on any of the example routers of FIGS. 5 and 6.

FIG. 8 is a flow diagram of an example method 800 for providing packet forwarding in the example router. The main acts of the method 800 are triggered when a packet is received on an ingress (incoming) port or interface. (Event 810) The types of checksum and frame checks that are required by the type of medium it serves are performed and the packet is output, as a serial bit stream. (Block 820) The packet is then decapsulated and parsed into (e.g., 64-byte) blocks. (Block 830) The packets are written to buffer memory and the forwarding information is passed on the Internet processor. (Block 840) The passed forwarding information is then used to lookup a route in the forwarding table. (Block 850) (Recall, e.g., FIGS. 6A-6D.) Note that the forwarding table can typically handle unicast packets that do not have options (e.g., accounting) set, and multicast packets for which it already has a cached entry. Thus, if it is determined that these conditions are met (YES branch of Decision 860), the packet forwarding component finds the next hop and egress interface, and the packet is forwarded (or queued for forwarding) to the next hop via the egress interface (Block 870) before the method 800 is left (Node 890) Otherwise, if these conditions are not met (NO branch of Decision 860), the forwarding information is sent to the control component 510 for advanced forwarding resolution (Block 880) before the method 800 is left (Node 890).

Referring back to block 870, the packet may be queued. Actually, as stated earlier with reference to FIG. 6, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 622 may send a request for the packet to the second DBM ASIC 635*b*. The DBM ASIC 635 reads the blocks from shared memory and sends them to the I/O manager ASIC 622 on the FPC 620, which then serializes the bits and sends them to the media-specific ASIC of the egress interface. The I/O manager ASIC 615 on the egress PIC 610 may apply the physical-layer framing, perform the CRC, and send the bit stream out over the link.

Referring back to block 880 of FIG. 8, as well as FIG. 6, regarding the transfer of control and exception packets, the system control board 640 handles nearly all exception packets. For example, the system control board 640 may pass exception packets to the control component 510.

Although example embodiments consistent with the present disclosure may be implemented on the example routers of FIG. 4 or 5, embodiments consistent with the present disclosure may be implemented on communications network nodes (e.g., routers, switches, etc.) having different architectures. For example, methods consistent with the present description may be run on any modern server, or even a virtual machine (e.g., without any ASICs or packet forwarding engines). More generally, embodiments consistent with the present disclosure may be implemented on an example system 900 as illustrated on FIG. 9.

Figure 9:
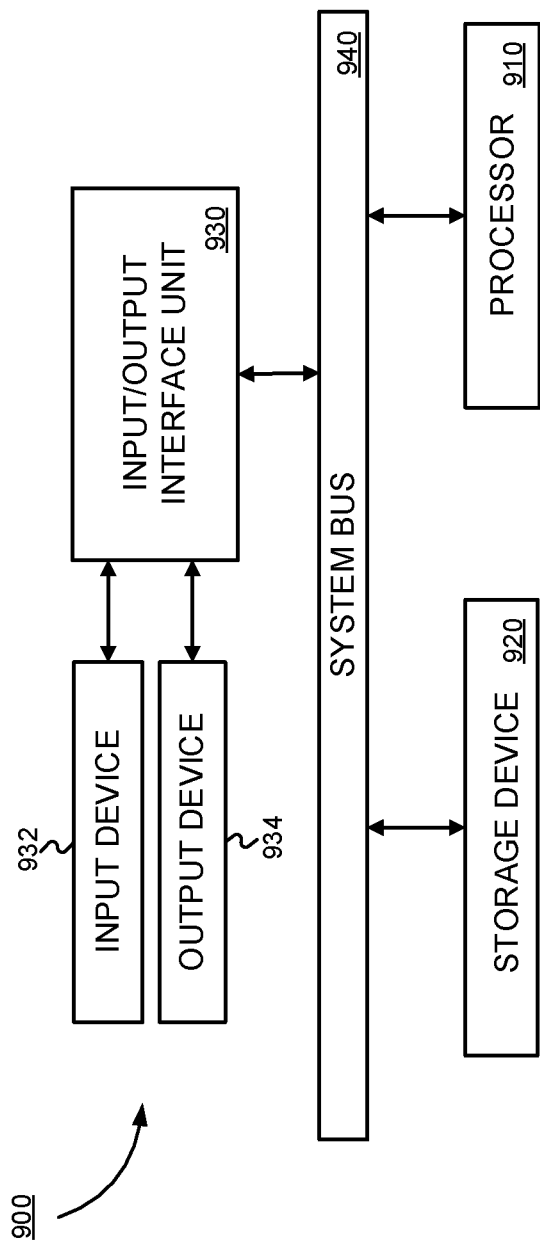
FIG. 9 is a block diagram of an example processor-based system that may be used to execute the example methods and/or to store information used and/or generated by such example methods.

FIG. 9 is a block diagram of an exemplary machine 900 that may perform one or more of the methods described, and/or store information used and/or generated by such methods. The exemplary machine 900 includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930. The one or more processors 910 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 920 and/or may be received from an external source via one or more input interface units 930. The machine executable instructions may be stored as various software modules, each module performing one or more operations. Functional software modules are examples of components, which may be used in the apparatus described.

In some embodiments consistent with the present disclosure, the processors 910 may be one or more microprocessors and/or ASICs. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program, which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities. As already noted above, although many of the acts of the example method 200 were described as being performed by a node, such as an ingress node of the LSP(s), some of all of the acts of example method 200 may be performed by a controller (e.g., a computer, a server, etc.) which can communicate control information to and from the nodes (e.g., the ingress and transit nodes) of the LSP(s).

4.4 Example of Operation of Example Method

Figure 10A:
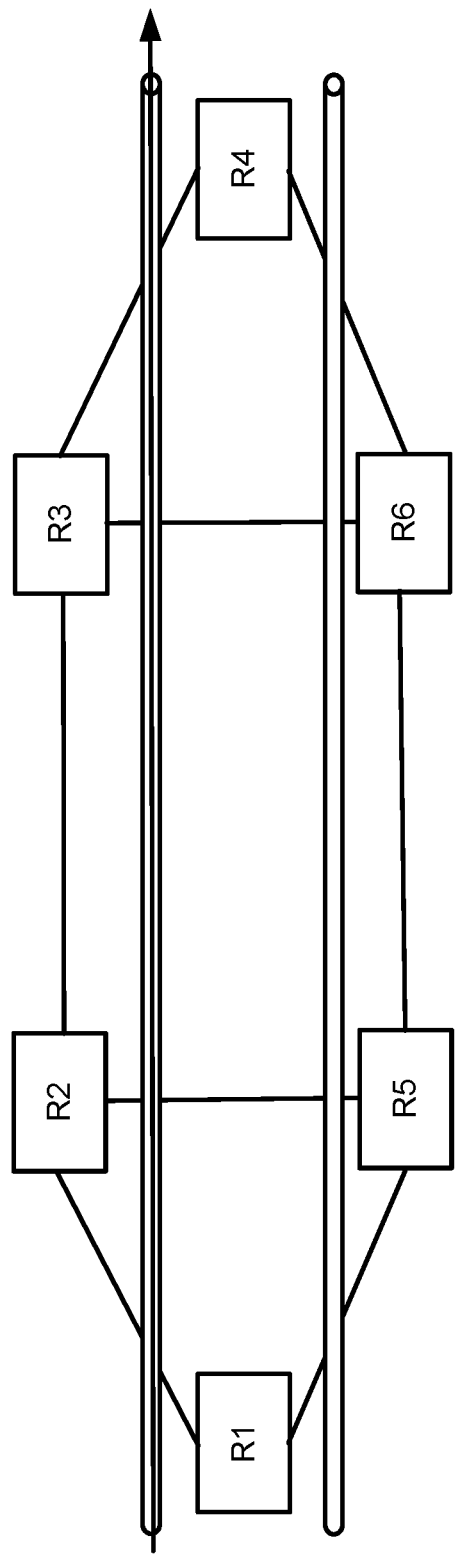
FIGS. 10A-10E illustrate an example of operations of an example method consistent with the present description.
Figure 10B:
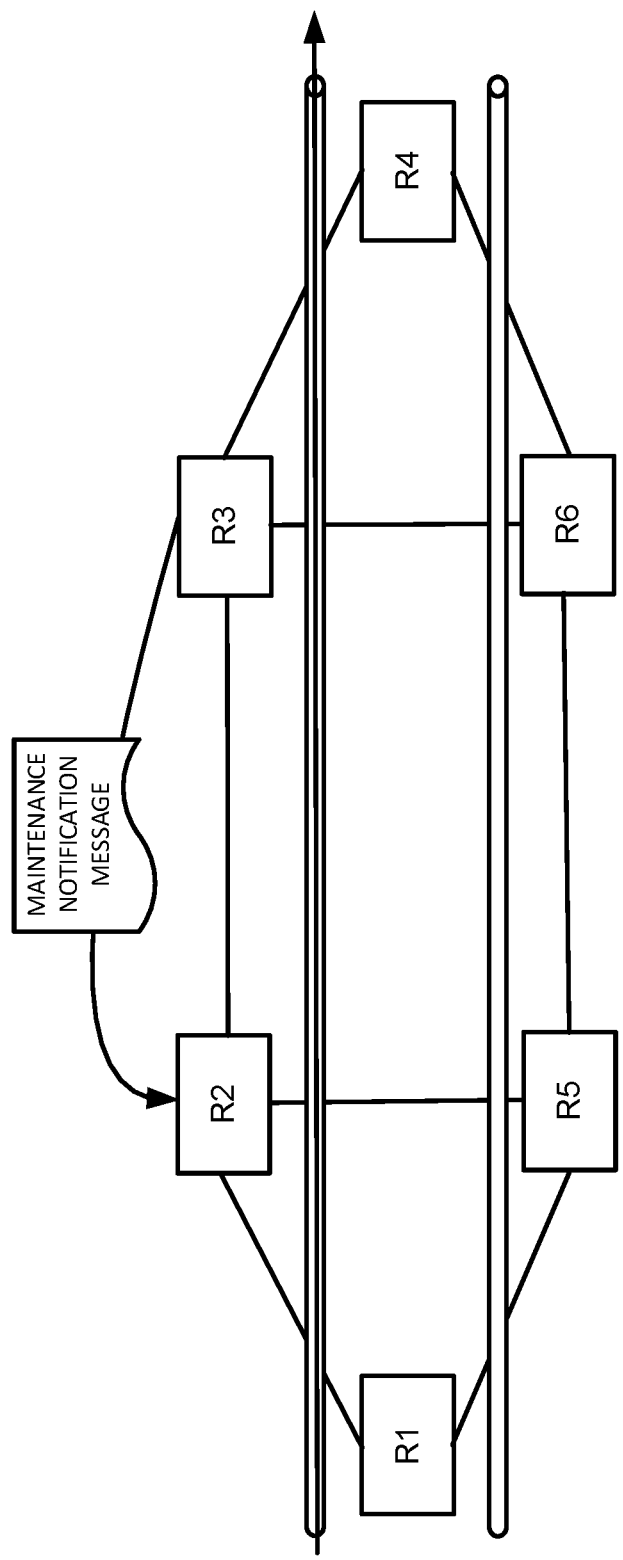

An example illustrating the operation of example method 200 is now described with reference to the example network 1000 of FIGS. 10A-10E. First, assume that two RSVP LSPs are configured from R1 to R4; one which is signaled via R2 and R3 (i.e., R1-R2-R3-R4), and another via R5 and R6 (i.e., R1-R5-R6-R4). As shown in FIG. 10A, assume that the LSP using R2 and R3 as transit routers is being used to forward traffic from ingress node R1 to egress node R4. Assume further that R3 node will need to go for maintenance and that its administrator or operator configures a maintenance notification message (e.g., the message 300 of FIG. 3, such as RSVP overload). Referring to FIG. 10B, this causes a maintenance notification message (e.g., an RSVP path-error "overload") to be sent to R3's (e.g., upstream) neighbors (and/or a controller, not shown) indicating that R3 will be going out for maintenance. (Recall, e.g., 215 of FIG. 2.)

Figure 10C:
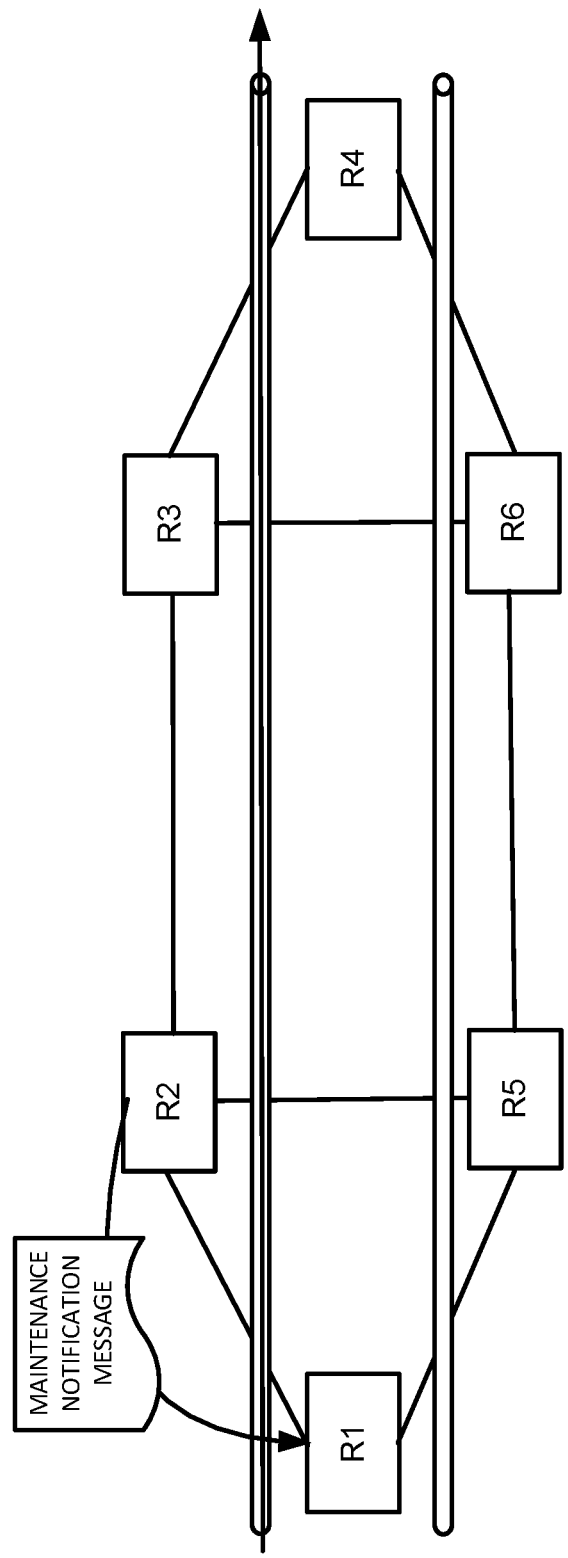

Referring next to FIG. 10C, assume that the maintenance notification message (or its contents) will reach to ingress node R1 via R2. Both R1 and R2 are now aware that the node R3 will be going offline for maintenance. In response to receiving the maintenance notification message (e.g., RSVP path error type "overload"), the ingress node R1 checks for an alternative available path. (Recall, e.g., decision 230, YES and block 235 of FIG. 2.) If an alternative path is available (Recall, e.g., decision 230, YES), the ingress node R1 switches over (e.g., in an MBB manner) the LSP traffic to the other available LSP. (Recall, e.g., block 255 of FIG. 2.) In case it doesn't have one, the node R1 can create another path for the LSP instance to the destination and smoothly switch over (e.g., in an MBB manner) the traffic to new LSP-instance. (Recall, e.g., blocks 245 and 250 of FIG. 2.) However, as show in FIG. 10D, the LSP traffic is switched over the other available LSP before the expiration T1* of the first timer, which forwards traffic from ingress node R1 to egress node R4 via transit nodes R5 and R6. The approach used in Auto-Bandwidth ("BW") LSPs (a current MPLS application supported by the JUNOS operating system from Juniper Networks, Inc. of Sunnyvale, Calif.) when they undergo a BW change and initiate a new instance to switch to the new instance via MBB, can be used for the switchover.

If the node scheduled to be under maintenance (i.e., R3) is configured with an RSVP-overload timer and the "overload-kick-in-timer", the path error "overload" may have a new type-length-value ("TLV") to carry these timers. For example, the first (e.g., kick-in) timer informs the ingress node R1 that it still can continue using R3, but has x seconds (as defined in the first timer value) to find alternative path to switch over to (e.g., in a MBB fashion). An RSVP-overload bit can also be carried to a controller (e.g., that does not contribute to LSP forwarding) via an existing signaling mechanism. The controller can therefore be integrated to use the information in the maintenance notification message to provision a new LSP/Path and thus achieve (e.g., MBB) switchover by sending an appropriate instruction(s) to ingress router R1. (Recall, e.g., 245 and 250 of FIG. 2, which may be performed by an ingress node of the LSP, and/or by the controller.)

The ingress node R1 doesn't need to tear down the LSP(s). Instead, after receiving the RSVP-overload path error message (and after expiration of the kick-in timer), it marks the LSP as unusable for the period of overload-timer expiry. (Recall, e.g., block 260 or 265, and block 275 and 280 of FIG. 2.) Since the RSVP-overload path error traverses from the node R3, which is scheduled to go for maintenance, to the ingress node R1 hop by hop, each node within the path makes a note of RSVP-overload path error and overload-timer and understands that the transit node R3 supporting the LSP is to be under maintenance. Consequently, the soft state of RSVP Hellos may be relaxed (Recall, e.g., block 220 of FIG. 2.), but ingress and transit nodes within the path maintain the LSP in the UP state.

Figure 10D:
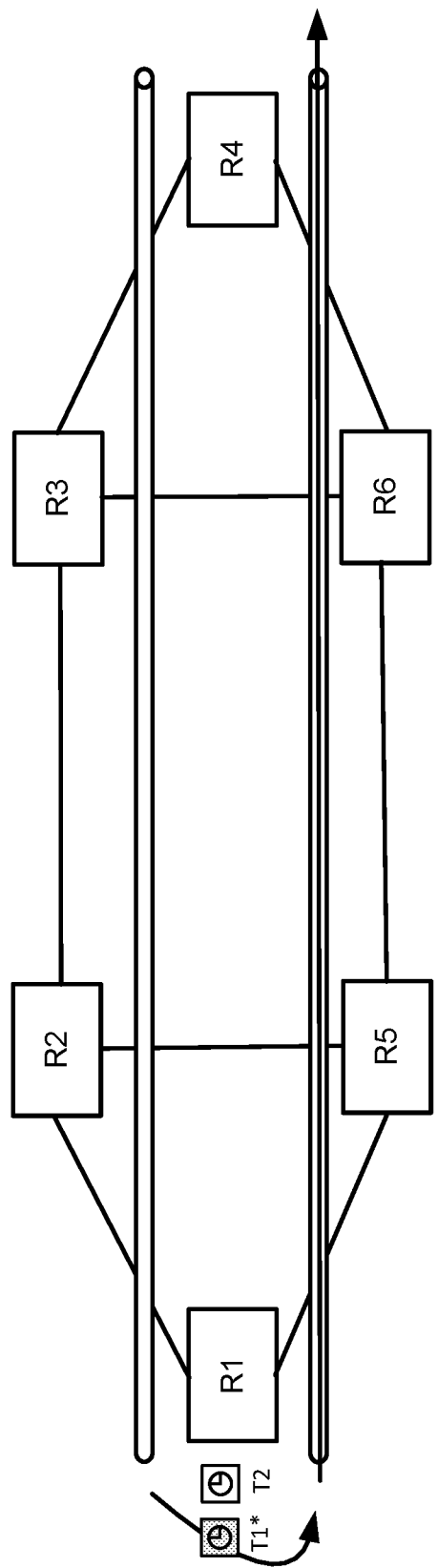

Still referring to FIG. 10D, the ingress node R1 also utilizes the overload-kick-in-timer (T1) for a MBB shift of traffic from the existing LSP (e.g., via R2 and R3) to another (e.g., equal cost, multiple-path ("ECMP")) LSP (e.g., via R5 and R6). (Recall, e.g., block 255 of FIG. 2.) If an alternative path is not set up (Recall, e.g., Decision 240, NO, of FIG. 2.), the ingress node R1 can signal a new path and then start utilizing the new path for traffic forwarding purposes. (Recall, e.g., blocks 245 and 250 of FIG. 2.)

Figure 10E:
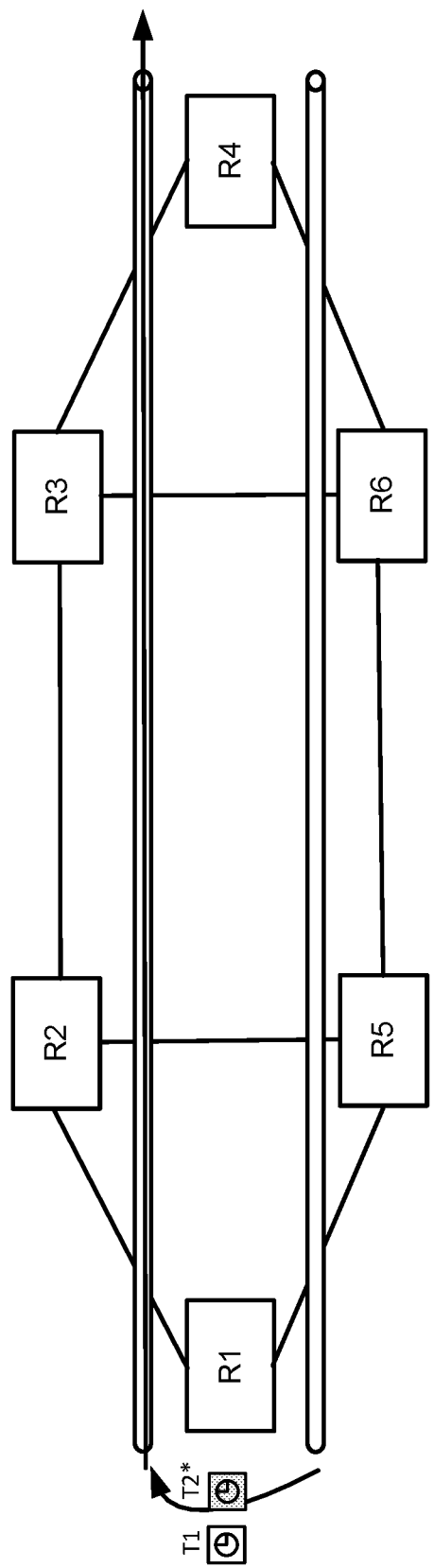

Referring to FIG. 10E, after the overload timer expires (as shown by T2*), the node R3 that signaled that it is scheduled to be under maintenance is assumed to have completed the maintenance and will push back the MPLS labels for the LSP to the forwarding information base ("FIB"). No new path message is needed to inform ingress node R1 that this maintenance activity completed. Instead ingress node R1 relies on the expiration of the overload timer. When this occurs, the original LSP is marked as usable for traffic forwarding purpose. Shifting the traffic back to the original LSP can also be achieved in MBB fashion. (Recall, e.g., blocks 275 and 280 of FIG. 2.)

4.5 Refinements, Extensions and Alternatives

As noted above, although the example method 200 can be implemented on one or more nodes of an LSP, the example method can be integrated with a controller for provisioning based on input received that the node is scheduled to go under maintenance. Indeed, the message need not originate from the transit node scheduled to go under maintenance.

Some network topologies and configurations may include a bypass LSP (e.g., in which the RSVP interface under maintenance has a bypass LSP passing through it). In such topologies/configurations, the ingress point of the bypass LSP should be notified that the bypass LSP will no longer available after expiration of the rsvp-overload-kick-in timer, until expiration of the rsvp-overload timer. In response, the ingress point thus will either use another bypass LSP or create a new bypass LSP if available, and program the packet forwarding engine ("PFE") with the new bypass LSP label. In this way, bypass LSPs are also covered by example embodiments consistent with the present description.

Regarding the first (kick-in) timer value, a value of 300 seconds (5 minutes) should be sufficient time to permit an ingress node to computer a new LSP if necessary.

Regarding the second (overload) timer value, even if the ingress router switches back to the original LSP while the transit router is still offline, a self-PING can be used to confirm that the transit router of the original LSP is back online.

Although some of the described embodiments concerned a transit router going down, example embodiments consistent with the present description could be used in the case of a line card or interface from the egress node going under maintenance. In such a case, there could be an alternative path available via another line card or interface. For example, it is possible that only one Flexible PIC (i.e., Physical Interface Card) Concentrator (FPC) of an egress node is to be taken offline for maintenance, in which case there can be other feasible paths still available to reach the destination (e.g., via another FPC in the egress node).

4.6 Conclusions

Example embodiments consistent with the present description may have one or more of the following advantages. First, such example embodiments address content customers' challenges when their transit nodes go for maintenance, and the traditional approach of IGP overload (which is very expensive) is used. Second, the ingress node can switch the LSP to a new instance in a MBB fashion, thereby providing a smooth transition of traffic from one LSP to another. Third, there is no need to tear down the LSPs after receiving the overload path error. (This avoids the need for network-wide SPF computation.) Instead the ingress node just doesn't use the original LSP for forwarding. The RSVP soft state refresh can be maintained by the peer nodes by relaxing any Hello exchange for the overload-timer. Fourth, there is no need to use IGP overload, and LSP traffic can be shifted smoothly. As should be appreciated from the foregoing, example embodiments consistent with the present description provide mechanisms to notify ingress RSVP node(s) for any transit node maintenance activity, thereby enabling the ingress node(s) to divert the traffic smoothly in MBB fashion, while avoiding high utilization of resources (such as for SPF computations). In contrast, the traditional approach of OSPF/ISIS overload results in a network-wide disturbance that doesn't achieve faster traffic shifts in MBB fashion.

Example embodiments consistent with the present description may be deployed in one or more routers of the LSP (e.g., transit and ingress nodes) and/or in a controller.

What is claimed is:

1. A computer-implemented method for use in a system having an established label switched path (LSP) and including a transit router and an ingress router, the computer-implemented method comprising:
   a) receiving an instruction that the transit router, or a component of the transit router supporting the established LSP, will be taken down for maintenance at some time in the future, for some defined duration;
   b) generating at least one maintenance notification message (1) specifying the established LSP, (2) including information directly or indirectly specifying the time, and (3) including information specifying the defined duration; and
   c) transmitting the at least one maintenance notification message to at least one of (A) an upstream neighbor node in the established LSP, and (B) a central controller.

2. The computer-implemented method of claim 1 wherein the information directly or indirectly specifying the time is a first timer value, and the information specifying the defined duration is a second timer value.

3. The computer-implemented method of claim 2 further comprising:
   d) receiving the at least one notification message from a downstream neighbor node; and
   e) responsive to receiving the at least one notification message,
      1) starting a first timer using the first timer value, and
      2) relaxing signaling used to maintain the established LSP.

4. The computer-implemented method of claim 3 wherein the at least one notification message received from a downstream neighbor node is received by the ingress router, the computer-implemented method further comprising:
   e) responsive to receiving the at least one notification message,
      3) determining whether an alternative label switched path (LSP) to an egress router of the established LSP is available, and
      4) responsive to a determination that the alternative LSP to the egress router of the established LSP is available,
         switching over traffic from the established LSP to the alternative LSP, and
      otherwise, responsive to a determination that the alternative LSP to the egress router of the established LSP is not available,
         establishing a new label switched path (LSP) to the egress router of the established LSP, and
         switching over traffic from the established LSP to the new LSP.

5. The computer-implemented method of claim 4 wherein the act of switching over traffic from the established LSP to the alternative LSP is performed in a make-before-break manner.

6. The computer-implemented method of claim 4 wherein the act of switching over traffic from the established LSP to the new LSP is performed in a make-before-break manner.

7. The computer-implemented method of claim 4, further comprising:
   f) responsive to an expiration of the first timer, starting a second timer using the second timer value; and
   g) responsive to an expiration of the second timer, switching traffic from one of (A) the alternative LSP or (B) the new LSP back to the established LSP.

8. The computer-implemented method of claim 7 wherein the act of switching traffic from one of (A) the alternative LSP or (B) the new LSP back to the established LSP is performed in a make-before-break manner.

9. The computer-implemented method of claim 4, further comprising:
   f) responsive to an expiration of the first timer,
      1) marking the established LSP as unusable for traffic forwarding, and
      2) starting a second timer using the second timer value; and
   g) responsive to an expiration of the second timer, switching traffic from one of (A) the alternative LSP or (B) the new LSP back to the established LSP.

10. The computer-implemented method of claim 1 wherein the at least one maintenance notification message is a single message carried in a single packet.

11. The computer-implemented method of claim 1 wherein the instruction that the transit router, or a portion of the transit router supporting the established LSP, will be taken down for maintenance at some time in the future, for some defined duration, is received from a command line interface of the transit router.

12. The computer-implemented method of claim 1 wherein the instruction that the transit router, or a portion of the transit router supporting the established LSP, will be taken down for maintenance at some time in the future, for some defined duration, is received from a management interface of the transit router.

13. A system comprising:
   a) a transit router of an established label switched path (LSP), the transit router including
      1) an input interface receiving an instruction that the transit router, or a component of the transit router supporting the established LSP, will be taken down for maintenance at some time in the future, for some defined duration,
      2) at least one processor generating at least one maintenance notification message (i) specifying the established LSP, (ii) including information directly or indirectly specifying the time, and (iii) including information specifying the defined duration, and
      3) an output interface transmitting the at least one maintenance notification message to at least one of (A) an upstream neighbor node of the established LSP, and (B) a central controller.

14. The system of claim 13 wherein the information directly or indirectly specifying the defined time is a first timer value, and the information specifying the defined duration is a second timer value.

15. The system of claim 14 further comprising:
   b) an ingress router including
      1) an input interface receiving the at least one notification message from a downstream neighbor node, and
      2) at least one processor that, responsive to the ingress router receiving the at least one notification message,
         A) determines whether an alternative label switched path (LSP) to an egress router of the established LSP is available, and
         B) responsive to a determination that the alternative LSP to the egress router of the established LSP is available,
            switches over traffic from the established LSP to the alternative LSP, and otherwise, responsive to a determination that the alternative LSP to the egress router of the established LSP is not available, establishes a new label switched path (LSP) to the egress router of the established LSP, and switches over traffic from the established LSP to the new LSP.

16. The system of claim 15 wherein the at least one processor of the ingress router further
    C) starts, responsive to an expiration of a first timer corresponding to the first timer value, a second timer using the second timer value; and
    D) switches, responsive to an expiration of the second timer, traffic from one of the alternative LSP or the new LSP back to the established LSP.

17. The system of claim 16 wherein the at least one processor of the ingress router further marks, responsive to an expiration of the first timer, the established LSP as unusable for traffic forwarding.

18. An ingress router for use in a system supporting an established label switched path (LSP), the ingress router comprising:
    a) an input interface receiving at least one notification message from a downstream neighbor node a maintenance notification message (1) specifying the established LSP, (2) including information directly or indirectly defining a time in the future that a transit router, or a component of the transit router supporting the established LSP, will be taken down for maintenance, and (3) including information defining a duration during which the transit router will be taken down for maintenance; and
    b) at least one processor that, responsive to the ingress router receiving the at least one notification message,
        1) determines whether an alternative label switched path (LSP) to an egress router of the established LSP is available, and
        2) responsive to a determination that the alternative LSP to the egress router of the established LSP is available,
            switches over traffic from the established LSP to the alternative LSP, and
        otherwise, responsive to a determination that the alternative LSP to the egress router of the established LSP is not available,
            establishes a new label switched path (LSP) to the egress router of the established LSP, and
            switches over traffic from the established LSP to the new LSP.

19. The ingress router of claim 18 wherein the information directly or indirectly specifying the defined time is a first timer value, and the information specifying the defined duration is a second timer value, and
    wherein the at least one processor further
        3) starts, responsive to an expiration of a first timer corresponding to the first timer value, a second timer using the second timer value, and
        4) switches, responsive to an expiration of the second timer, traffic from one of the alternative LSP or the new LSP back to the established LSP.

20. The ingress router of claim 19 wherein the at least one processor further marks, responsive to an expiration of the first timer, the established LSP as unusable for traffic forwarding.

* * * * *